United States Patent [19]

Fitzpatrick et al.

[11] Patent Number: 4,654,088
[45] Date of Patent: Mar. 31, 1987

[54] DECOATING OF ALUMINUM SCRAP

[75] Inventors: Nigel P. Fitzpatrick, Kingston; Richard E. G. Lee, Kitimat, both of Canada

[73] Assignee: Alcan International Limited, Montreal, Canada

[21] Appl. No.: 412,273

[22] Filed: Aug. 27, 1982

Related U.S. Application Data

[63] Continuation-in-part of Ser. No. 198,860, Oct. 20, 1980, abandoned.

[30] Foreign Application Priority Data

Oct. 8, 1981 [GB] United Kingdom ................ 8130402

[51] Int. Cl.⁴ ............................ B08B 5/00; B08B 7/04
[52] U.S. Cl. .......................................... 134/18; 134/19; 134/25.1; 134/38; 75/445; 75/68 R
[58] Field of Search ..................... 134/5, 19, 25.1, 32, 134/38, 18, 20; 432/7, 11, 14; 266/901, 205; 75/445, 68 R

[56] References Cited

U.S. PATENT DOCUMENTS

| 3,346,417 | 10/1967 | Ehrlich | 134/19 X |
| 3,668,077 | 6/1972 | Ban | 201/29 |
| 3,762,858 | 10/1973 | Torrence | 266/901 X |
| 3,985,497 | 10/1976 | Fellnor et al. | 266/901 X |
| 4,032,361 | 6/1977 | Eriksson et al. | 134/19 |
| 4,135,702 | 1/1979 | Venetta et al. | 432/11 X |
| 4,147,531 | 4/1979 | Miller | 75/44 S |
| 4,235,646 | 11/1980 | Neufeld et al. | 148/2 |
| 4,264,060 | 4/1981 | Twyman | 266/901 X |
| 4,411,695 | 10/1983 | Twyman | 75/68 R |

FOREIGN PATENT DOCUMENTS 456010  3/1975  U.S.S.R. ................ 266/901

Primary Examiner—S. Leon Bashore
Assistant Examiner—K. M. Hastings
Attorney, Agent, or Firm—Cooper, Dunham, Griffin & Moran

[57]  ABSTRACT

A method of removing organic coatings from scrap aluminum which includes passing a bed of the scrap metal supported on a gas-permeable conveyor through a pyrolysis zone and passing an oxygen-containing hot gas downwardly through the scrap metal bed, the conveyor advancing continuously through the pyrolysis zone, the hot gas being at a temperature to raise the upper surface of the bed of scrap to a temperature in the range of 500°–600° C.; and the temperature and rate of supply and oxygen content of such gas and the rate of travel of the bed of scrap being adjusted to ensure that a reaction front at which the organic material is pyrolysed and residual carbon is burned travels from top to bottom of the bed within the pyrolysis zone and to allow the scrap to be retained within the pyrolysis zone for up to 10 minutes after the reaction front reaches the bottom of the bed.

2 Claims, 1 Drawing Figure

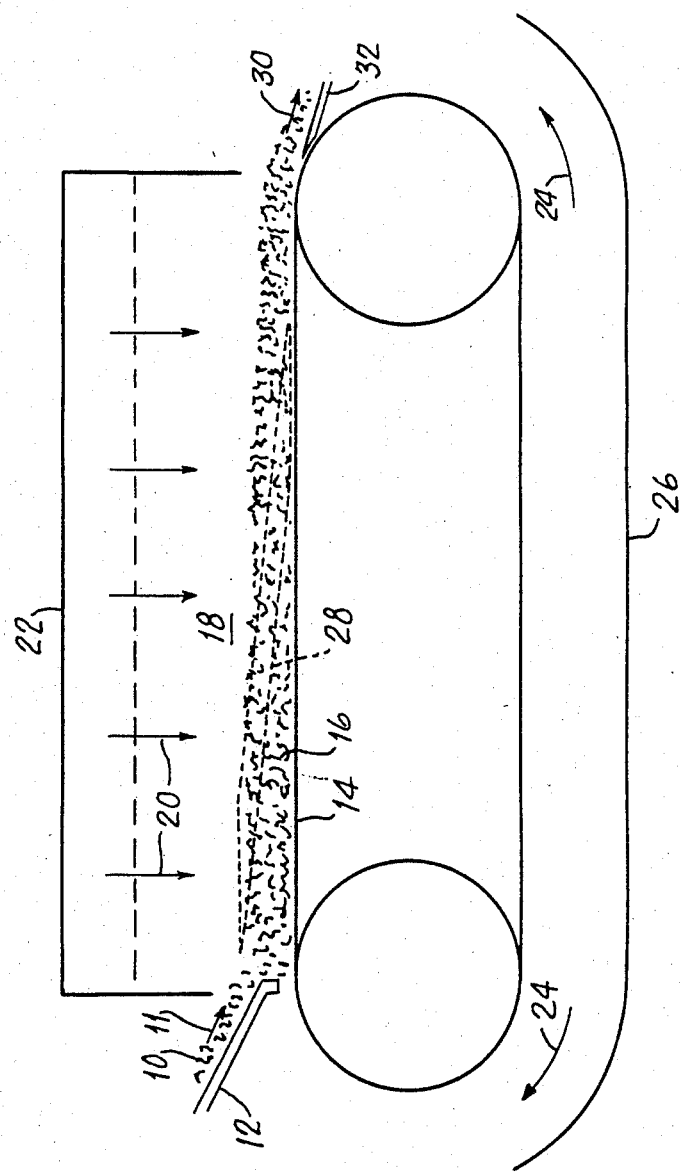

DECOATING OF ALUMINUM SCRAP

CROSS REFERENCE TO RELATED APPLICATION

This application is a continuation-in-part of applicants' copending U.S. patent application Ser. No. 198,860 filed Oct. 20, 1980 for Decoating of Aluminum Scrap, and now abandoned.

BACKGROUND OF THE INVENTION

This invention relates to removing organic coatings, such as paints, lacquers, and the like, from scrap aluminum (including aluminum alloys).

In order to recover coated aluminum scrap, the metal is commonly crushed, shredded, or chopped into smaller pieces. The scrap metal is then decoated, then melted and recovered.

The desirability of decoating prior to melting is well known. Decoating prevents violent gas evolution during melting. It also prevents the evolution of excessive smoke and flame which would otherwise put heavy intermittent demands on fume removal systems. Melting of coated scrap is also associated with large metal losses, which can be in amounts as high as 13% by weight.

A number of processes for decoating scrap metal are known. For example, the treatment of coated scrap metal in kilns, particularly rotary kilns, is well known. Although kilns may be used to remove organic coatings from scrap aluminum, they possess certain disadvantages in terms of effectiveness of heat transfer and rather long residence times. With shredded scrap metal, the major portion of heat transfer to the charge of shredded scrap occurs during the showering of the material through the air prior to its entry into the bed. Relatively little heat transfer actually occurs within the bed. As a result, shredded scrap metal comes up to temperature, usually about 550° C., at different rates and lighter materials are more susceptible to overoxidation because of the longer residence times of the scrap material at elevated temperature within the heating zone of the kiln.

Another known type of scrap decoating treatment involves the use of a vertical, moving packed bed. A vertical, moving packed bed results in better and more efficient heat transfer, but it is also thermally unstable. A further difficulty with vertical, moving bed processes is that high temperatures, e.g. above about 600° C., cause rapid oxidation of aluminum/magnesium alloys and therefore must be avoided. Significant amounts of oxidation may occur and large amounts of heat may be generated, resulting in destructive propagation of a reaction front through the bed.

It is known to subject divided solid material to heat (using blown hot air, for example) with the material arranged in a horizontally moving or travelling bed, e.g. for the sintering of iron ore pellets for subsequent use in blast furnaces; for the treatment of municipal solid waste which includes metallic waste; and for preheating scrap metal prior to melting. Known prior attempts to use such techniques for removing organic coatings from aluminum scrap have not achieved satisfactory decoating of the scrap. However, such attempts used upflow of air through the scrap.

SUMMARY OF THE INVENTION

The present invention provides a process for removing organic coatings from aluminum which provides the following advantages: the process results in close control of the temperature of the metal scrap and consequently, highly consistent and reproducible removal of organic coatings. In terms of efficiency, it is intermediate between vertical bed processes and kiln processes but is more stable in operation than both such processes. Finally, the rapid heat transfer rate of the present process volatilizes organic material from crevices to such an extent that it is possible to decoat effectively crushed beverage containers and cubes of baled foil, e.g. up to 2.5 cms, and to remove organics from between layers of shredded metal laminates.

The present invention embraces a process for rapidly and continuously removing adherent organic materials such as lacquer, paint or other coatings from scrap containing aluminum and for recovering decoated scrap metal.

According to the present invention, there is provided a method of removing organic coatings from scrap aluminum which includes passing a bed of the scrap metal supported on a gas-permeable conveyor through a pyrolysis zone and passing oxygen-containing hot gas downwardly through the scrap metal bed, the hot gas being at a temperature to raise the upper surface of the bed of scrap to a temperature in the range of 500° C.–600° C., the temperature and rate of supply and oxygen content of such gas and rate of travel of the bed of scrap being adjusted to ensure that a reaction front at which the organic material is pyrolysed and residual carbon is burned travels from top to bottom of the bed within the pyrolysis zone in such time as to allow the scrap to be retained within the pyrolysis zone for up to 10 minutes after the reaction front reaches the bottom of the bed. The conveyor is moved continuously through the pyrolysis zone.

The employment of a downward gas flow is an important feature of the process of the invention. The employment of a downward gas flow almost instantaneously raises the temperature of the scrap, on entry into the pyrolysis zone, to reaction temperature at the top of the bed to initiate a reaction front. Where upward gas flow is employed, it is necessary to raise the temperature of the conveyor to reaction temperature before the decoating reaction can be initiated. In the interim, some heating of the coated material takes place, and that has the effect of delaying the passage of the reaction front through the bed of scrap. With slow heating of the scrap, more pyrolysis of the coatings takes place on the scrap and thus more carbon must be burned off the scrap.

Preferably the heating of the top surface of the bed on entry to the pyrolysis zone is due to heat transfer from the gas stream. However, in some instances the external heat input into the bed may be supplemented by overhead radiant heaters. In such case, the gas temperature may be rather lower than the required temperature at the surface of the bed, e.g. up to 50° C. below the desired bed surface temperature.

The foregoing temperature conditions apply to the treatment of coatings on materials in an "as-received" condition. The present process enables performance of decoating independently of any chemical pretreatment step.

Further features and advantages of the invention will be apparent from the detailed description hereinbelow set forth, together with the accompanying drawings.

BRIEF DESCRIPTION OF THE DRAWING

The single figure is a simplified schematic elevational view of horizontally moving packed bed apparatus arranged for practice of the process of the invention in an illustrative embodiment thereof.

DETAILED DESCRIPTION

In accordance with the invention, a process is provided whereby scrap aluminum which is coated or partially covered with organic material or materials such as paint or lacquer or oil may be continuously and rapidly decoated. The scrap metal may then be recovered for subsequent remelting and reuse. This process is generally useful for aluminum scrap, e.g. empty beverage cans, aluminum siding sheet, aluminum foil, and other such products of which aluminum is a major component, or composites comprising another metal bonded to aluminum.

In accordance with the process of this invention, coated aluminum scrap metal is crushed or shredded or otherwise forced (e.g. cut or chopped) into smaller pieces according to customary practice in the scrap recovery industry. Referring to the drawing, the scrap 10 is continuously charged (arrow 11) from an inlet chute 12 onto a moving horizontal, porous conveyor such as a porous grate or moving endless woven wire screen 14 so as to form a packed bed 16 of scrap metal thereon. Alternatively, an open mesh vibrating screen conveyor could be employed. The conveyor 14, moving continuously in a horizontal direction, carries the packed bed of scrap metal through a pyrolysis zone 18 in which the scrap is contacted with hot gas, blown downwardly (arrows 20) through the bed 16 from a hot air supply housing 22. Exhaust gases are conducted away below the bed (arrows 24) through outlets defined by a surrounding housing 26.

The conveyor 14 preferably has a substantial resistance to gas flow, e.g. comparable to the resistance of the packed bed 16, so that excessive gas flow channelling does not occur through unoccupied areas of the belt in the event of interruptions in the supply of scrap to the bed 16.

In operation, the packed bed of coated scrap metal has a thickness of about 4–40 cms and is moved through the heating zone at a rate to provide a residence time of 2–20 minutes. As the packed bed moves through the pyrolysis zone, hot gas is continually blown or drawn downward, through the packed bed in a direction substantially perpendicular to the direction of movement of the packed bed of scrap metal. The hot gas employed in the process preferably should contain sufficient oxygen for the combustion of all the coating material. In practice, hot air will usually be employed. In specific embodiments of the method of the invention, the bed of scrap travels through the pyrolysis zone during a residence time of 2–10 minutes.

Within the packed bed of coated scrap metal, a pyrolysis reaction is initiated. Contact with the hot gas causes partial decomposition and distillation of the organic material on the metal scrap which results in removal of the organic coating. This decomposition reaction is exothermic in nature and causes a progressive increase in the temperature of the bed. When the sole heat input is due to the hot gas, the input gas temperature required to achieve the desired degree of reaction is a temperature in the range from about 500° C.–600° C., preferably about 510° C.–570° C., a temperature of at least about 540° C. being especially preferred. Outside the 500°–600° C. range, satisfactory results are less easily obtained. Lower temperatures do not provide adequate removal of the organic coating material when the scrap feed contains scrap coated with the more resistant of the coatings conventionally employed for coating aluminum. Higher temperatures result in oxidation of the scrap metal. Although some coatings may be consistently removed at lower temperatures, it is not satisfactory to conduct a scrap recovery system on the basis that none of the more resistant coatings will enter with the scrap feed. The location of the steady-state reaction zone within the bed is indicated in the drawing by broken line 28. Below and to the left of this zone (as viewed in the drawing), the metal in the bed is still coated, while the metal above and to the right of the reaction zone is decoated. The decoated scrap is discharged (arrow 30) on a chute 32, e.g. for transport to a remelting furnace.

It is at present preferred that the flow rate of the hot gas through the bed is about 10–60 Nm$^3$/minute/m$^2$ of bed, although it may be possible to use a gas velocity of less than 10 Nm$^3$/min./m$^2$ (e.g. as low as 5 Nm$^3$/min./m$^2$) in some circumstances. Although gas flow rates in excess of 60 Nm$^3$/min./m$^2$ can be employed in the process, the use of flow rates of this magnitude results in the requirement of increased hot gas for a given mass of scrap. Therefore, the fuel requirements and costs for heating the gas become greater. Within the range from about 10 Nm$^3$min./m$^2$–60 Nm$^3$/min./m$^2$, the optimal flow rate will vary depending upon the nature and density of the scrap metal being decoated and the thickness of the bed.

Since the temperature of the bed of scrap metal varies with the flow rate of the hot gas passing therethrough, the thickness of the bed must be restricted to ensure that temperatures within the bed remain below about 600° C. and to ensure that excessive metal oxidation is avoided. For the gas flow rates employed, namely rates in the range of about 10–60 Nm$^3$/min./m$^2$, the thickness of the bed should be kept below about 40 cm. The specific bed depth depends upon the scrap type and bed density.

In most instances, the air is heated by passage through a heat exchanger, in which it is heated by a gas stream from an afterburner, in which the volatiles from the pyrolysis zone are burned with supplementary gas or oil fuel. The supply of supplementary fuel to the afterburner is conveniently controlled in response to a presettable temperature measuring instrument arranged to measure the temperature of the air downstream of the heat exchanger.

Utilizing bed depths, temperatures, gas flow rates and the like as set forth hereinabove, the process can be employed to rapidly and continuously decoat aluminum scrap. Under optimal conditions, the residence time of the scrap in the pyrolysis zone is about 3–10 minutes. Such residence time will suffice for essentially complete removal of organic material from the scrap metal, but will not result in excessive oxidation of the scrap metal.

By way of further illustration of the process of the present invention, reference may be made to the following specific examples:

EXAMPLE 1

Waste aluminum beverage cans having organic (e.g. lacquer or paint) coatings are shredded and charged onto a horizontal, moving stainless steel woven wire belt conveyor so as to form a packed bed on the conveyor which is 7.5 cm deep, 243 cm wide, and 570 cm long and has a density of about 250 kg/m$^3$. The bed of shredded scrap is then moved through a pyrolysis zone where hot air at a temperature of about 550° C. is blown down upon the bed. If desired, suction may be applied to the underside of the moving conveyor to facilitate movement of the hot air through the packed bed. The blown air moves through the bed at a velocity of about 30 m/minute and the heat front speed is about 35 mm/minute (in the vertical direction). The hot, blown air passes through the bed, receives heat by combustion of the carbon residue of the organic coating, and exits the bed at a temperature of about 580° C. Assuming the shredded metal scrap requires one minute to decoat, the necessary residence time will be three minutes and the conveyor speed will be about 1.9 m/min. Substantially complete removal of organic coating from the shredded scrap metal will be obtained.

EXAMPLE 2

In a machine constructed as indicated in the accompanying drawing, the length of the bed in the pyrolysis zone was 12 meters and the bed width was 1 meter.

The machine was operated at a process input air temperature in the range of 500°-600° C. at flow rates in the range of 140°-420 Nm$^3$/min. The bed depth was in the range of 5-30 cm.

Trials were conducted with coated beverage containers (unshredded) which were crushed to form a bed of density of 120-170 Kg/m$^3$ on the belt. Other trials were conducted with shredded coated aluminum scrap, forming a bed of density of 170-250 Kg/m$^3$.

This material was satisfactorily decoated, when in a dry condition, with a residence time of 6-6½ minutes in the pyrolysis zone with a bed depth of 30 cm for the unshredded cans and a lesser bed depth of about 20 cms in the case of the shredded material. The air flow rate employed was 280 Nm$^3$/min. at 550° C.

In further trials to simulate the delivery of used scrap cans, possibly containing substantial remnants of the original contents, scrap cans were soaked in water overnight and delivered to a shredder in a condition where 72% of the total weight was water.

The wet shredded material was fed onto the conveyor at a rate to form a bed depth of 10-15 cm. Overhead air was supplied at the rate of 280 Nm$^3$/min. and temperature of 540° C.

This material was found to be satisfactorily dried out and decoated at a residence time of about 7 minutes.

Where it was known that the coating material for a large batch of material to be treated was one of the more readily pyrolysed coating materials, it has been possible to decoat the whole batch in much shorter residence times such as 2 minutes, with an air input temperature of about 550° C.

In other tests with the machine, the gas input contained a substantial proportion of recirculated gas from the exhaust from the pyrolysis zone, so that it had a diminished oxygen content of the order of 10%. It was found that the shredded coated scrap aluminum and unshredded crushed coated aluminum scrap could be decoated satisfactorily within a residence time of 10 minutes.

A comparison between rotary kiln decoating and the process of this invention may be made. Kiln trials have produced satisfactorily decoated shredded scrap metal on several occasions. In terms of quality of decoating, however, even under the best conditions, the interiors of folded shreds contain carbon. Increasing kiln treatment temperatures has caused aluminum scrap can lids to break up into a fine powder. The quality of the shreds obtained by the present process was better. The gold hues of the decoated shreds indicated less overall oxidation. The interiors of folded shreds were decoated with no detrimental effect on the can lids. Overheating caused blistering and, in the extreme, withering of the shredded scrap, but not pulverization.

More significantly, the kiln process demanded an accurate control over the mass flow rate of shredded scrap metal into the kiln in order to maintain proper decoating. Even modest density changes, e.g. 210-260 Kg/m$^3$, of relatively consistent shredded scrap metal caused problems in kiln temperature control. By contrast, in tests of the present process, it was found possible to accommodate major changes in scrap density, as well as to change to siding sheet scrap and pure coated foil scrap without noticeable difference in output quality.

Kilns have a defined limit to the amount of material volume which can be charged. Low density product means slow throughput. In the case of the present process, low density scrap can be accommodated by simply increasing the bed thickness.

Lastly, residence times and process temperatures in a kiln are only able to be assessed indirectly. The present process differs in that process temperatures and residence times are directly controllable. Under production conditions, teaching operators how to run the process is easy and it is possible to achieve a high degree of control in the process.

In addition to shredded or crushed scrap beverage cans and aluminum siding sheet, other aluminum-containing composite materials may be decoated using the present process. Thus, the process may be used to decoat a composite material comprising another metal bonded to aluminum by an organic coating and also to decoat "Dampf-aluminium", a sound-damped, three-part laminated, composite aluminum coil product manufactured by Alcan Aluminiumwerke GmbH of Germany, and consisting of an aluminum base coated with a viscoelastic adhesive damping agent constrained by a thin aluminum skin. "Dampf-aluminium" is used in numerous applications including mobile homes, airplanes, garage doors, wall and roof cladding, and window sills.

It is to be understood that the invention is not limited to the procedures and embodiments hereinabove specifically set forth, but may be carried out in other ways without departure from its spirit.

We claim:

1. A method of removing organic coatings from scrap aluminum which comprises passing a bed of the scrap metal supported on a gas-permeable conveyor through a pyrolysis zone and passing an oxygen-containing hot gas downwardly through the scrap metal bed, the conveyor moving continuously through said zone, the hot gas being at a temperature to raise the upper surface of the bed of scrap to a temperature in the range of 500°-600° C., and the temperature and the rate of supply and oxygen content of said gas and the rate of travel of the bed of scrap being such that a reaction front at which the organic material is pyrolysed and residual carbon is burned travels from top to bottom of the bed within the pyrolysis zone, wherein the sole external source of heat for the upper surface of the bed of scrap is a stream of oxygen-containing gas at a temperature in the range of 500°-600° C.; wherein the oxygen containing gas is air; and wherein the hot air stream is heated to the desired temperature in a heat exchanger by heat interchange with the gases issuing from the pyrolysis, in which the combustible components are burned in admixture with supplemental fuel.

2. A method according to claim 1, wherein the supply of supplemental fuel is controlled by a temperature responsive instrument which responds to the air temperature downstream of the heat exchanger.

* * * * *